United States Patent
Thiebes et al.

(10) Patent No.: US 11,834,545 B2
(45) Date of Patent: Dec. 5, 2023

(54) MOISTURE-CURING COMPOSITIONS

(71) Applicant: Covestro Deutschland AG, Leverkusen (DE)

(72) Inventors: Christoph Thiebes, Cologne (DE); Florian Stempfle, Cologne (DE); Hans-Josef Laas, Odenthal (DE); Beate Baumbach, Burscheid (DE); Ute Nattke, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 468 days.

(21) Appl. No.: 16/957,061

(22) PCT Filed: Dec. 14, 2018

(86) PCT No.: PCT/EP2018/084860
§ 371 (c)(1),
(2) Date: Jun. 22, 2020

(87) PCT Pub. No.: WO2019/121351
PCT Pub. Date: Jun. 27, 2019

(65) Prior Publication Data
US 2020/0392278 A1 Dec. 17, 2020

(30) Foreign Application Priority Data
Dec. 22, 2017 (EP) .................. 17209987

(51) Int. Cl.
C08G 18/00 (2006.01)
C08G 18/38 (2006.01)
B01J 31/22 (2006.01)
C08G 18/22 (2006.01)

(52) U.S. Cl.
CPC ...... *C08G 18/3893* (2013.01); *B01J 31/2234* (2013.01); *C08G 18/222* (2013.01); *B01J 2531/38* (2013.01); *C08G 2150/00* (2013.01); *C08G 2170/00* (2013.01); *C08G 2190/00* (2013.01)

(58) Field of Classification Search
None
See application file for complete search history.

(56) References Cited

U.S. PATENT DOCUMENTS

| 3,971,751 A | 7/1976 | Isayama et al. |
|---|---|---|
| 5,364,955 A | 11/1994 | Zwiener et al. |
| 6,207,766 B1 | 3/2001 | Doi et al. |
| 7,060,778 B2 | 6/2006 | Hofacker |
| 9,732,180 B2 | 8/2017 | Burckhardt et al. |
| 9,994,744 B2 | 6/2018 | Choffat |
| 2011/0034627 A1 | 2/2011 | Boudet et al. |
| 2011/0040033 A1* | 2/2011 | Maliverney .......... C08K 5/0091 528/25 |
| 2012/0245241 A1 | 9/2012 | Peiffer et al. |
| 2015/0031806 A1* | 1/2015 | Lim .................. C08L 75/04 524/266 |
| 2017/0101564 A1* | 4/2017 | Choffat ............. C08G 18/6692 |

FOREIGN PATENT DOCUMENTS

| DE | 102004012876 A1 | 10/2005 |
|---|---|---|
| DE | 102009057598 A1 | 6/2011 |
| EP | 596360 A1 | 5/1994 |
| EP | 0654302 A1 | 5/1995 |
| EP | 2952533 A1 | 12/2015 |
| JP | 931151 A | 2/1997 |
| JP | 200856849 A | 3/2008 |
| JP | 2015506917 A | 3/2015 |
| JP | 2015513319 A | 5/2015 |
| WO | 2013090132 A2 | 6/2013 |
| WO | WO-2013165552 A2 | 11/2013 |

OTHER PUBLICATIONS

Machine translation of DE-102004012876, translation generated Jun. 2022, 7 pages. (Year: 2022).*
International Search Report for PCT/EP2018/084860 dated Feb. 21, 2019.
Written Opinion of the International Searching Authority for PCT/EP2018/084860 dated Feb. 21, 2019.

* cited by examiner

Primary Examiner — Robert S Loewe
(74) Attorney, Agent, or Firm — THE WEBB LAW FIRM

(57) ABSTRACT

A method for producing polyurethanes containing alkoxysilane groups comprises the step of reacting a compound containing at least one NCO group with a compound containing at least one Zerewitinoff-active H atom in the presence of a catalyst component, wherein the compound containing at least one NCO group and/or the compound containing at least one Zerewitinoff-active H atom contain at least one alkoxysilane group, to obtain a polyurethane containing alkoxysilane groups. The invention also relates to a polymer containing alkoxysilane groups, a method for producing a curable polymer, a curable polymer, a cured polymer, and the use thereof. The polymers contain a complex of a lanthanide with at least one beta-diketonate ligand, preferably $Yb(acac)_3$, and are free from organic tin compounds.

12 Claims, No Drawings

MOISTURE-CURING COMPOSITIONS

CROSS-REFERENCE TO RELATED APPLICATIONS

This application is a national stage application (under 35 U.S.C. § 371) of PCT/EP2018/084860, filed Dec. 14, 2018, which claims benefit of European Application No. 17209987.1, filed Dec. 22, 2017, both of which are incorporated herein by reference in their entirety.

The present invention relates to a process for producing alkoxysilane-containing polyurethanes, comprising the step of reacting a compound containing at least one NCO group with a compound containing at least one Zerewitinoff-active H atom in the presence of a catalyst component, wherein the compound containing at least one NCO group and/or the compound containing at least one Zerewitinoff-active H atom contain at least one alkoxysilane group, to afford an alkoxysilane-containing polyurethane. The invention further relates to an alkoxysilane-containing polymer, to a process for producing a curable polymer, to a curable polymer, to a cured polymer and to the use thereof.

Moisture-curable compositions based on silane-functional polymers are known and are employed in large amounts for example in construction as elastic sealants or elastic parquet flooring adhesives.

Silane-functional polymers may be divided into three different classes which differ in terms of their silane group reactivity, this being reflected in the curing rate of the moisture-curable compositions produced therefrom.

Polymers produced by hydrosilylation of polymers having terminal double bonds, for example poly(meth)acrylate polymers or polyether polymers, are known. They are described for example in U.S. Pat. Nos. 3,971,751 and 6,207,766. These have the disadvantage of low reactivity and the production of moisture-curable compositions having practicable curing times thus in many cases requires addition of tin-containing curing catalysts for production which are toxicologically concerning and suffer from ever decreasing market acceptance.

Polymers in which so-called gamma-silane groups are bonded to the polymer backbone via urethane or urea groups are markedly more reactive and production of moisture-curable compositions with practicable curing times is in many cases possible with only small amounts, if any, of tin-containing catalysts.

The third class is that of polymers in which so-called alpha-silane groups are bonded to the polymer backbone via urethane or urea groups and which in some cases cure rapidly even without specific curing catalysts. The disadvantage of these classes is that on account of their high reactivity they are unstable and costly and have poor availability The production of commercial silane-terminated polyurethane prepolymers involves catalysis of the reaction of NCO groups with Zerewitinoff-active H atoms. Dibutyltin dilaurate (DBTL) is usually used for this. However, due to the toxicological properties of DBTL, there is a need for alternative catalysts.

DBTL is also used to manufacture curable compositions based on silane-functional polymers. Here too, there is a need for alternative catalysts on account of the toxicological properties of DBTL.

WO 2013/165552 A1 describes the use of certain polyacrylates of ytterbium as possible curing catalysts for moisture-curable compositions containing reactive silane groups but lacks a concrete example.

U.S. Pat. No. 7,060,778 B2 describes Yb(acac)$_3$ as a catalyst for transesterification of aliphatic oligocarbonate polyols. DE 102004012876 A1 describes Yb(acac)$_3$ as a catalyst for the NCO/OH reaction.

A further disadvantage of many metal catalysts, in particular of organic tin catalysts is that in curable compositions based on silane-functional polymers, used as building sealants for example, they result in a markedly increased secant modulus after curing so that the requirement of ISO 11600 for low-modulus sealants (secant modulus at 23 degrees Celsius of not more than 0.4 MPa according to ISO 8339) cannot be met or large amounts of plasticizer are necessary to meet the standard, thus increasing the risk of join edge contamination through migration of the plasticizer into the edge zones of the joined substrates (Praxishandbuch Dichtstoffe, IVK, 4. Auflage, p. 139f).

EP 2 952 533 A1 discloses a moisture-curable sealant comprising a) at least one silane-functional polymer and b) at least one catalyst for crosslinking the silane-functional polymer, wherein the sealant is free from organotin compounds and in the cured state has a secant modulus at 100% elongation and 23° C. determined according to ISO 8339 of less than 0.4 MPa and a resilience at 100% elongation determined according to ISO 7389 of more than 70%. According to this document the sealant is suitable in particular as a construction sealant of class 25LM according to DIN EN ISO 11600, in particular as a facade sealant.

The present invention accordingly has for its object to provide moisture-reactive compositions based on silane-functional polymers which overcome the disadvantages of the prior art and undergo complete curing essentially without addition of organic tin compounds and have a low secant modulus in the cured state.

This object is achieved according to the invention by a process as claimed in claim 1, an alkoxysilane-containing polyurethane as claimed in claim 8, a process for producing a curable polymer as claimed in claim 10, a curable polymer as claimed in claim 12, a cured polymer as claimed in claim 13 and a use as claimed in claim 15. Advantageous developments are specified in the subsidiary claims and the description. They may be combined as desired unless the opposite is clear from the context.

A process for producing alkoxysilane-containing polyurethanes, comprises the step of reacting a compound containing at least one NCO group with a compound containing at least one Zerewitinoff-active H atom in the presence of a catalyst component, wherein the compound containing at least one NCO group and/or the compound containing at least one Zerewitinoff-active H atom contain at least one alkoxysilane group, to afford an alkoxysilane-containing polyurethane. The catalyst component contains a complex of a lanthanoid with at least one beta-diketonate ligand and the catalyst component is free from organic tin compounds.

It has been found that the beta-diketonate complex of the lanthanoid may be employed as a urethanization catalyst and can remain in the alkoxysilane-containing polyurethane in order to likewise act as a catalyst or at least not have any negative effect in a subsequent silane crosslinking.

This process according to the invention thus makes it possible to produce precursors for coating compositions, adhesives, elastomers and sealing compositions without having to accept the toxicological disadvantages of DBTL-based urethanization catalysts.

The term "curable" generally means in particular that the composition is capable of conversion from a relatively flexible, optionally plastically deformable state into a harder state under the influence of external conditions, in particular under the influence of moisture present in the environment and/or intentionally supplied. The crosslinking may generally be effected through chemical and/or physical influences in addition to the abovementioned moisture, i.e. for example also through supply of energy in the form of heat, light or other electromagnetic radiation but also through simple contacting of the composition with air or a reactive component.

Acyloxysilanes are also included in the term alkoxysilanes according to the invention.

In one embodiment of the process the reaction affording the polyurethane is at least periodically performed at a temperature of ≥50° C. (preferably ≥60° C.) for a duration of ≥10 minutes (preferably for ≥100 minutes to ≤500 minutes).

The freedom of the catalyst component from organic tin compounds is in the context of the present invention defined such that the content of organic tin compounds in the reaction mixture affording the polyurethane and is also in the obtained polyurethane is ≤0.06% by weight and preferably ≤0.01% by weight based on the total weight of the alkoxysilane-containing polyurethane.

Quantitative determination of the content of organic tin compounds is carried out by extraction of the sample (optional) with n-hexane, derivatization (optional) with sodium tetraethylborate and gas chromatography, wherein detection by atom emission is preferred. Details may be defined for example in the dissertation "Bestimmung von Organozinnverbindungen in Sedimenten mittels GC-AED —Entwicklung von Extraktions—und Derivatisierungsmethoden" by Almut Liebich, Technische Universität Berlin 2005 (http://dx.doi.org/10.14279/depositonce-1164).

Thus, in particular no organotin based catalysts such as DBTL (dibutyltin dilaurate) are employed in the reaction. Organotin compounds may generally be defined as including all compounds containing a covalent Sn—C bond.

This also includes not introducing any organic tin catalysts or residues from any precursors such as polyurethane prepolymers into the reaction mixture for the process according to the invention.

The content of the lanthanoid-beta-diketonate complex based on the total weight of the components employed in the reaction may be for example ≥0.0001% by weight to ≤1% by weight. Preferred contents are ≥0.002% by weight to ≤0.05% by weight, more preferably ≥0.005% by weight to ≤0.1% by weight.

Suitable lanthanoids in the beta-diketonate complexes are in particular ions of oxidation state (III) of cerium, praseodymium, neodymium, promethium, samarium, europium, gadolinium, terbium, dysprosium, holmium, erbium, thulium, ytterbium, lutetium or mixtures thereof. In one embodiment of this process of the lanthanoid is ytterbium (III).

In a further embodiment of this process the beta-diketonate ligand is obtainable by deprotonation of hacac (acetylacetone), hacac-F$_7$ (perfluoroacetylacetone), hbfa (benzoyl-2-furanoylmethane), hbpp (1,3-bis(3-pyridyl)-1,3-propanedione), Hbtfac (benzoyltrifluoroacetone), hbzac (benzoylacetone), hdbbm (di(4-bromo)benzoylmethane), hdcm (d,d-dicampholylmethane), hdmbm (4,4'-dimethoxydibenzoylmethane), hdmh (2,6-dimethyl-3,5-heptanedione), hdnm (dinaphthoylmethane), hdpm (dipivaloylmethane), hdppm (di(perfluoro-2-propoxypropionyl)methane), hdtp (1,3-di(2-thienyl)-1,3-propanedione), hfacam (3-(trifluoroacetyl)-d-camphor), hfdh (6,6,6-trifluoro-2,2-dimethyl-3,5-hexanedione), hfhd (1,1,1,2,2,6,6,7,7,7-decafluoro-3,5-heptanedione), hfod (6,6,7,7,8,8,8-heptafluoro-2,2-dimethyl-3,5-octanedione), hftac (2-furyltrifluoroacetone), hhfac (hexafluoroacetylacetone), hhfbc (3-(heptafluorobutyryl)-d-camphor), hhfth (4,4,5,5,6,6,6-heptafluoro-1-(2-thienyl)-1,3-hexanedione), hmfa (4-methylbenzoyl-2-furanoylmethane), hmhd (6-methyl-2,4-heptanedione), hntac (2-naphthoyltrifluoroacetone), hpop (3-(5-phenyl-1,3,4-oxadiazol-2-yl)-2,4-pentanedione), hppa (3-phenyl-2,4-pentanedione), hpta (=htpm) (pivaloyltrifluoroacetone), hptp (1-phenyl-3-(2-thienyl)-1,3-propanedione), H(t-cam) (3-(tert-butylhydroxymethylene)-d-camphor), htfac (trifluoroacetylacetone), htfn (1,1,1,2,2,3,3,7,7,8,8,9,9,9-tetradecafluoro-4,6-nonanedione), hthd (=hdpm, htmhd) (2,2,6,6-tetramethyl-3,5-heptanedione), htnb (4,4,4-trifluoro-1-(2-naphtyl)-1,3-butanedione), htmod (2,2,6,6-tetramethyl-3,5-octanedione), htrimh (2,2,6-trimethyl-3,5-heptanedione), htod (2,2,7-trimethyl-3,5-octanedione), htta (2-thenoyltrifluoroacetone) or any desired mixture thereof. Hacac is preferred.

In a further embodiment of the process the complex of a lanthanoid with at least one beta-diketonate ligand is Yb(acac)$_3$.

In a further embodiment of this process the compound containing at least one NCO group contains at least one alkoxysilane group and the compound containing at least one Zerewitinoff-active H atom contains no alkoxysilane group. Suitable examples of such isocyanatoalkoxysilanes include isocyanatomethyltrimethoxysilane, isocyanatomethyltriethoxysilane, isocyanatomethyltriisopropoxysilane, 2-isocyanatoethyltrimethoxysilane, 2-isocyanatoethyltriethoxysilane, 2-isocyanatoethyltriisopropoxysilane, 3-isocyanatopropyltrimethoxysilane, 3-isocyanatopropyltriethoxysilane, 3-isocyanatopropylmethyldimethoxysilane, 3-isocyanatopropylmethyldiethoxysilane, 3-isocyanatopropylethyldiethoxysilane, 3-isocyanatopropyldimethylethoxysane, 3-isocyanatopropyldiisopropylethoxysilane, 3-isocyanatopropyltripropoxysilane, 3-isocyanatopropyltriisopropoxysilane, 3-isocyanatopropyltributoxysilane, 3-isocyanatopropylmethyldibutoxysilane, 3-isocyanatopropylphenyldimethoxysilane, 3-isocyanatopropylphenyldiethoxysilane, 3-isocyanatopropyltris(methoxyethoxyethoxy)silane, 2-isocyanatoisopropyltrimethoxysilane, 4-isocyanatobutyltrimethoxysilane, 4-isocyanatobutyltriethoxysilane, 4-isocyanatobutyltriisopropoxysilane, 4-isocyanatobutylmethyldimethoxysilane, 4-isocyanatobutylmethyldiethoxysilane, 4-isocyanatobutylethyldimethoxysilane, 4-isocyanatobutylethyldiethoxysilane, 4-isocyanatobutyldimethylmethoxysilane, 4-isocyanatobutylphenyldimethoxysilane, 4-isocyanatobutylphenyldiethoxysilane, 4-isocyanato(3-methylbutyl)trimethoxysilane, 4-isocyanato(3-methylbutyl)triethoxysilane, 4-isocyanato(3-methylbutyl)methyldimethoxysilane, 4-isocyanato(3-methylbutyl)methyldiethoxysilane and 11-isocyanatoundecyltrimethoxysilane or any desired mixtures of such isocyanatoalkoxysilanes.

Contemplated Zerewitinoff-active compounds include for example polyether polyols (in particular polypropylene glycols), polyester polyols and OH-terminated polyurethane prepolymers.

The obtained reaction product may especially have the structure (I):

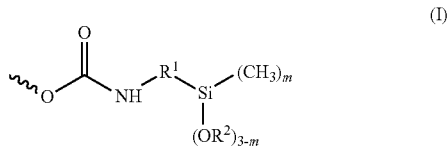

(I)

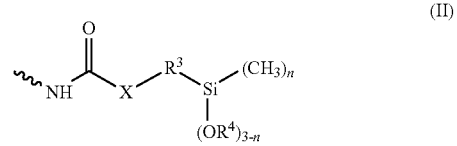

(II)

wherein $R^1$ represents an alkylene radical having 1 to 6 carbon atoms, $R^2$ represents a methyl radical or an ethyl radical and m represents 0 or 1 or 2.

It is preferable when m represents 0.

$R^1$ preferably represents a 1,3-propylene group and/or a methylene group (—CH$_2$—).

In a further embodiment of this process the compound containing at least one NCO group contains no alkoxysilane group and the compound containing at least one Zerewitinoff-active H atom contains at least alkoxysilane group.

Suitable monomeric diisocyanates are especially 1,4-diisocyanatobutane (BDI), 1,5-diisocyanatopentane (PDI), hexamethylene 1,6-diisocyanate (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-iso-3,3,5-trimethyl-5-isocyanatomethylcyclohexane (isophorone diisocyanate; IPDI), 1-isocyanato-1-methyl-4(3)-isocyanatomethylcyclohexane, 2,4'- and 4,4'-diisocyanatodicyclohexylmethane (H12MDI), 1,3- and 1,4-bis(isocyanatomethyl)cyclohexane, bis(isocyanatomethyl)norbornane (NBDI), 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bi(cyclohexyl), 4,4'-diisocyanato-3,3'-dimethyl-1,1'-bi(cyclohexyl), 4,4'-diisocyanato-2,2',5,5'-tetramethyl-1,1'-bi(cyclohexyl), 1,8-diisocyanato-p-menthane, 1,3-diisocyanatoadamantane, 1,3-dimethyl-5,7-diisocyanatoadamantane, 1,3- and 1,4-bis(isocyanatomethyl)benzene (xylylene diisocyanate; XDI), 1,3- and 1,4-bis(1-isocyanato-1-methylethyl)benzene (TMXDI), bis(4-(1-isocyanato-1-methylethyl)phenyl) carbonate, 2,4- and 2,6-diisocyanatotoluene (TDI), 2,4'- and 4,4'-diisocyanatodiphenylmethane (MDI), 1,5-diisocyanatonaphthalene and mixtures thereof. Polyisocyanates produced from diisocyanates, such as for example those having a biuret, urethane or isocyanurate structure, are also possible as NCO-containing compounds.

In a preferred embodiment the diisocyanate is selected from 1-isocyanato-3,3,5-trimethyl-5-isocyanatomethylyclohexane (IPDI), 1,6-hexamethylene diisocyanate (HDI), 2,4- and/or 2,6-tolylene diisocyanate (TDI) or mixtures thereof.

Such a reaction product is obtainable for example from the reaction of isocyanate-containing polyethers, especially NCO-terminated urethane polyethers from the reaction of polyether polyols with a superstoichiometric amount of polyisocyanates, with aminosilanes, hydroxysilanes or mercaptosilanes. Such a silane-functional polymer especially comprises structures of formula (II)

wherein

X represents O or S or $NR^5$, wherein $R^5$ represents a hydrogen atom or a hydrocarbon radical having 1 to 20 carbon atoms which optionally comprises cyclic proportions and optionally comprises an alkoxysilylgroup or one or more ether or carboxylic esters groups, $R^3$ represents a divalent hydrocarbon radical having 1 to 18 carbon atoms which optionally comprises cyclic and/or aromatic proportions and optionally comprises one or more heteroatoms, $R^4$ represents an alkyl radical having 1 to 5 carbon atoms which optionally contains an ether group and n represents 0 or 1 or 2.

It is preferable when n represents 0.

It is preferable when $R^3$ represents 1,3-propylene or 1,4-butylene or 3,3-dimethyl-1,4-butylene and X represents $NR^5$, wherein $R^5$ preferably represents a radical of formula

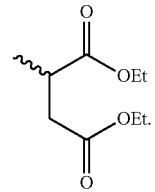

It is further preferable when X represents O and R represents a radical of formula

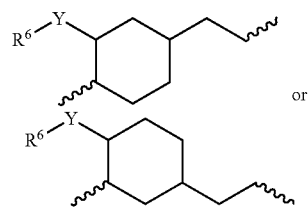

or wherein this radical is configured such that X is bonded directly to the cyclohexyl ring and wherein Y represents O or $NR^7$ and $R^6$ and $R^7$ each independently of one another represent a monovalent hydrocarbon radical having 1 to 18 carbon atoms which may comprise heteroatoms in the form of ether oxygen or thioether sulfur or tertiary amine nitrogen, or together with Y (or N) form a ring, in particular a morpholine ring.

In a further embodiment of this process the compound containing at least one Zerewitinoff-active H atom contains at least one primary or secondary amino group. It is preferably N-(2-aminoethyl)-3-aminopropyltrimethoxysilane, N-cyclohexyl-3-aminopropyltrimethoxysilane, N-cyclohexylaminomethyltriethoxysilane, 3-aminopropyltriethoxysilane, 3-(2-aminomethylamino)propyltriethoxysilane, N-(2-aminoethyl)-3-aminopropylmethyldimethoxysilane, 3-aminopropyltrimethoxysilane, 3-ureidopropyltrimethoxysilane, N-(3-trimethoxysilylpropyl)aspartic acid diethyl ester or mixtures thereof. Also suitable are corresponding compounds which contain ethoxy groups instead of methoxy groups or vice versa or else contain acyloxy groups.

The invention further relates to an alkoxysilane-containing polymer, wherein the polymer contains a complex of a lanthanoid with at least one beta-diketonate ligand and the polymer is free from organic tin compounds. In terms of the lanthanoid, the beta-diketonate ligand and the absence of organic tin compounds the same considerations apply as above in respect of the inventive process comprising reaction of NCO groups with Zerewitinoff-active H atoms. For the sake of conciseness they are not repeated. It should only be noted that a preferred lanthanoid complex is likewise Yb(acac)$_3$.

The alkoxysilane-containing polymer, also known as a silane-functional polymer is preferably a polyolefin, a polyester, a polyamide, a poly(meth)acrylate or a polyether or a hybrid of these polymers. The silane groups thereof may be at lateral positions in the chain or terminal. It is particularly preferable when the silane-functional polymer is a polyolefin or a polyester or a polymethacrylate or a polyether or a hybrid of these polymers.

For example the silane-functional polymer may be a silane-containing polyether. It preferably comprises a majority of oxyalkylene units, in particular 1,2-oxypropylene units. The silane groups are preferably dialkoxysilane groups and/or trialkoxysilane groups, in particular dimethoxymethylsilane groups or trimethoxysilane groups or triethoxysilane groups.

The silane-functional polymer is preferably free from isocyanate groups.

On average the silane-function polymer has preferably 1.3 to 4, in particular 1.5 to 3, particularly preferably 1.7 to 2.8, silane groups per molecule.

The silane-functional polymer preferably has an average molecular weight in the range from 1000 to 30 000 g/mol, in particular from 2000 to 20 000 g/mol.

The silane-functional polymer is preferably liquid at room temperature. It particularly preferably has a low viscosity. The viscosity at 20° C. is in particular in the range from 1 to 200 Pa s, preferably 2 to 100 Pa s, particularly preferably 5 to 50 Pa s.

The silane-function polymer is preferably selected from the group consisting of
- silane-containing polyethers obtained from the reaction of allyl-containing polyethers with hydrosilanes, optionally with chain extension, in particular with diisocyanates;
- silane-containing polyethers obtained from the copolymerization of alkylene oxides and epoxysilanes, optionally with chain extension, in particular with diisocyanates;
- silane-containing polyethers obtained from the reaction of polyether polyols with isocyanatosilanes, optionally with chain extension with diisocyanates; and
- silane-containing polyethers obtained from the reaction of isocyanate-containing urethane polyethers with aminosilanes or hydroxysilanes or mercaptosilanes.

These silane-functional polymers are particularly readily obtainable.

Preferred among these are the silane-containing polyethers obtained from the reaction of allyl-containing polyethers with hydrosilanes. These silane-functional polymers have a particularly low viscosity and are particularly inert.

Also preferred among these are the silane-containing polyethers obtained from the reaction of polyether polyols with isocyanatosilanes. These silane-functional polymers are particularly readily obtainable, have a very low viscosity and are rather inert.

Also suitable are commercially available silane-functional polymers, in particular products available under the trade names MS Polymer™ (from Kaneka Corp.; especially types S203H, S303H, S227, S810, MA903 or S943); MS Polymer™ or Silyl™ (from Kaneka Corp.; especially types SAT010, SAT030, SAT200, SAX350, SAX400, SAX725, MAX450, MAX602 or MAX951); Excestar® (Asahi Glass Co. Ltd.; especially types S2410, S2420, S3430 or S3630); SPUR+® (from Momentive Performance Materials; especially types 101 OLM, 1015LM or 1050MM); Vorasil™ (from Dow Chemical Co.; especially types 602 or 604); Desmoseal® (from Bayer MaterialScience AG; especially the types S XP 2458, XP 2636, S XP 2749, S XP 2774 or S XP 2821); TEGOPAC® (from Evonik Industries AG; especially the types Seal 100, Bond 150 or Bond 250); or Geniosil® STP (from Wacker Chemie AG; especially types E15 or E35, E10 and E-30).

A silane-functional polymer obtained from the reaction of allyl-containing polyethers with hydrosilanes, optionally with chain extension with diisocyanates for example, in particular has structures of formula (III)

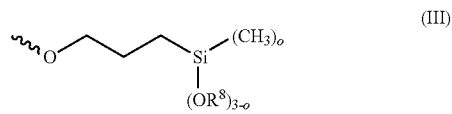

(III)

wherein
R$^8$ represents a methyl radical or an ethyl radical and
o represents 0 or 1 or 2.

It is preferable when o represents 0 or 1, in particular 1, and R$^8$ represents a methyl radical.

A silane-functional polymer obtained from the copolymerization of alkylene oxides and epoxy silanes, optionally with chain extension with diisocyanates for example, in particular has structures of formula (IV)

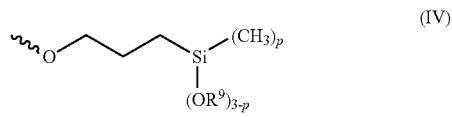

(IV)

wherein
R$^9$ represents a methyl radical or an ethyl radical and
p represents 0 or 1 or 2,
preferably 0.

In one embodiment of this polymer the polymer is a polyurethane obtainable by a process described hereinabove.

In one embodiment the viscosity of the polyurethane (plate-cone rotating viscometer, 23° C., ISO 3219:1994) is ≤115% of the viscosity of a comparative polyurethane produced by the same production process but with dibutyltin dilaurate instead of the complex of the lanthanoid with at least one beta-diketonate ligand in the catalyst component.

A further aspect of the invention is a process for producing a curable polymer, wherein the process comprises the step of contacting a polymer as described above with a siloxane condensation catalyst. Suitable siloxane condensation catalysts include any desired non-organotin catalysts.

Particularly preferred catalysts for the crosslinking of silane-functional polymers are those comprising at least one amidino group. These are especially a compound of formula (V):

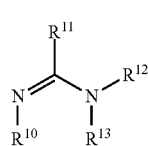

(V)

The radical $R^{10}$ represents a hydrogen atom, a monovalent hydrocarbon radical having 1 to 10 carbon atoms or, together with $R^{13}$, an optionally substituted, divalent hydrocarbon radical having 1 to 10 carbon atoms.

The radical $R^{11}$ represents a hydrogen atom, a monovalent hydrocarbon radical having 1 to 12 carbon atoms, optionally comprising cyclic or aromatic proportions and optionally comprising one or more heteroatoms, an amino group or, together with $R^{12}$, an optionally substituted, divalent hydrocarbon radical having 1 to 10 carbon atoms.

The radical $R^{12}$ represents a hydrogen atom, a monovalent hydrocarbon radical having 1 to 12 carbon atoms, optionally comprising cyclic or aromatic proportions and optionally comprising one or more heteroatoms or, together with $R^{11}$, an optionally substituted, divalent hydrocarbon radical having 1 to 10 carbon atoms.

The radical $R^{13}$ represents a hydrogen atom, a monovalent hydrocarbon radical having 1 to 10 carbon atoms or together with $R^{10}$ an optionally substituted, divalent hydrocarbon radical having 1 to 10 carbon atoms.

The radical $R^{11}$ and/or $R^{12}$ having heteroatoms is an alkyl radical having a silane group, such as for instance an alkyltrialkoxysilane radical.

The compound comprising at least one amidino group is preferably a guanidine, an imidazole, an imidazoline, a bicyclic amidine or a derivative of these compounds. Such derivatives are for example substituted imidazoles or imidazolines, especially a silane-comprising imidazole or imidazoline.

Preferred compounds having at least one amidino group are 1,8-diazabicyclo[5.4.0]undec-7-ene (DBU), 1,5-diazabicyclo[4.3.0]non-5-ene (DBN), 6-(dibutylamino)-1,8-diazabicyclo[5.4.0]undec-7-ene, N-methyltriazabicyclodecene, tetramethylguanidine, 2-guanidinobenzimidazole, acetylacetoneguanidine, 1,3-di-o-tolylguanidine (DTG), 1,3-diphenylguanidine, o-tolylbiguanidine, 2-tert-butyl-1,1,3,3-tetramethylguanidine or N-(3-triethoxysilylpropyl)-4,5-dihydroimidazole, N-(3-trimethoxysilylpropyl)-4,5-dihydroimidazole.

The proportion of the siloxane condensation catalyst is preferably 0.01% to 3% by weight, in particular 0.03% to 2% by weight, preferably 0.05% to 0.5% by weight, of the total composition. At proportions of more than 0.5% by weight sweating of the compound out of the cured composition may occur, which is disadvantageous for certain applications (visual appearance, easily soiled applications, etc).

It is preferable when the amidine is a bicyclic amidine, in particular having 9, 10, 11 or 12 carbon atoms in the bicyclic constituent. The advantage of these compounds is that they have a relatively high reactivity and the content thereof may therefore be kept relatively low. This in turn makes it possible to reduce the sweating of these compounds out of the cured composition.

Likewise suitable as siloxane condensation catalysts are amino-containing catalysts such as DABCO (1,4-diazabicyclo[2.2.2]octane).

Likewise suitable as siloxane condensation catalysts are monomeric amino-containing silanes, as they are also used as adhesive silane.

In one embodiment of this process the polymer is further contacted with water.

The invention further relates to a curable polymer obtainable by an above described process according to the invention. The curable polymer is preferably a constituent of a curable formulation together with auxiliary and additive substances. It is for example employed in an amount of 10% to 80% by weight, in particular in an amount of 15% to 50% by weight, preferably 20% to 40% by weight, based on the total composition. Such a formulation may contain the following components, wherein Yb(acac)$_3$ may originate from the reaction for producing the curable polymer:
  a) between 10% by weight and 50% by weight of alkoxysilane-containing polymer;
  b) Ytterbium (III) acetylacetonate between 0.0001% by weight and 0.1% by weight;
  c) between 0.001% by weight and 3% by weight of at least one catalyst for the crosslinking of silane-functional polymers, selected from compounds containing neither tin or tin ions nor organotin compounds;
  d) auxiliary and additive substances.

The following auxiliary and additive substances in particular are suitable:
  Inorganic and organic fillers, in particular natural, ground or precipitated calcium carbonates, optionally coated with fatty acids, in particular stearic acid, barite, talc, quartz flours, quartz sand, dolomites, wollastonites, kaolins, calcined kaolins, mica, molecular sieves, aluminum oxides, aluminum hydroxides, magnesium hydroxide, silicas including highly disperse silicas from pyrolysis processes, industrially manufactured carbon black, graphite, metal powders such as aluminum, copper, iron, silver or steel, PVC powder or hollow spheres of inorganic or organic materials.
  Adhesion promoters and/or crosslinking agents, in particular silanes such as in particular aminosilanes, such as in particular 3-aminopropyltrimethoxysilane, 3-aminopropyldimethoxymethylsilane, N-(2-aminoethyl)-3-aminopropyltrimethoxysilane, N-(2-aminoethyl)-3-aminopropylmethyldimethoxysilane, N-(2-aminoethyl)-N'-[3-(trimethoxysilyl)propyl]
  ethylenediamine or analogs thereof with ethoxy or isopropoxy groups instead of the methoxy groups on the silicon, N-phenyl-, N-cyclohexyl- or N-alkylaminosilanes, also mercaptosilanes, epoxysilanes, (meth)acryloylsilanes, anhydridosilanes, carbamatosilanes, alkylsilanes, vinylsilanes or iminosilanes, or oligomeric forms of these silanes or adducts of primary aminosilanes with epoxysilanes or (meth)acryloylsilanes or anhydridosilanes. 3-Glycidoxypropyltrimethoxysilane, 3-aminopropyltrimethoxysilane, N-(2-aminoethyl)-3-aminopropyltrimethoxysilane, N-(2-aminoethyl)-N'-[3-(trimethoxysilyl)propyl]ethylenediamine, 3-mercaptopropyltrimethoxysilane, 3-ureidopropyltriethoxysilane, vinyltrimethoxysilane or the corresponding silanes with ethoxy groups instead of the methoxy groups or oligomeric forms of these silanes are especially suitable.

Plasticizers, in particular carboxylic esters such as phthalates, in particular dioctyl phthalate, diisononyl phthalate or diisodecyl phthalate, adipates, in particular dioctyl adipate, azelates, sebacates, polyols, in particular polyoxyalkylene polyols or polyester polyols, glycol ethers, glycol esters, organic phosphoric or sulfonic acid esters, polybutenes or fatty acid methyl or ethyl esters derived from natural fats or oils, so-called "biodiesel", dialkyl 1,2-cyclohexanedicarboxylates such as diisononyl 1,2-cyclohexanedicarboxylate.

Optionally solvents.

Drying agents, in particular tetraethoxysilane, vinyltrimethoxysilane or vinyltriethoxysilane or organoalkoxysilanes having a functional group in a position to the silane group, in particular N-(methyldimethoxysilylmethyl)-O-methylcarbamate, (methacryloxymethyl) silanes, methoxymethylsilanes, orthoformate esters or calcium oxide or molecular sieves.

Stabilizers against oxidation, heat, light or UV radiation.

Pigments, especially titanium dioxide or iron oxides.

Rheology modifiers, especially thickeners, in particular phyllosilicates such as bentonites, derivatives of castor oil, hydrogenated castor oil, polyamides, polyurethanes, urea compounds, pyrogenic silicas, cellulose ethers or hydrophobically modified polyoxyethylenes.

Fibers, in particular glass fibers, carbon fibers, metal fibers, ceramic fibers or plastic fibers such as polyamide fibers or polyethylene fibers.

Dyes.

Natural resins, fats or oils such as colophony, shellac, linseed oil, castor oil or soybean oil.

Nonreactive polymers, such as in particular, homo- or copolymers of unsaturated monomers, in particular from the group comprising ethylene, propylene, butylene, isobutylene, isoprene, vinyl acetate or alkyl (meth)acrylates, in particular polyethylenes (PE), polypropylenes (PP), polyisobutylenes, ethylene vinyl acetate copolymers (EVA) or atactic poly-a-olefins (APAO).

Flame retardant substances, in particular the abovementioned fillers aluminum hydroxide or magnesium hydroxide, or in particular organic phosphoric esters such as in particular triethyl phosphate, tricresyl phosphate, triphenyl phosphate, diphenylcresyl phosphate, isodecyldiphenyl phosphate, tris(1,3-dichloro-2-propyl) phosphate, tris(2-chloroethyl) phosphate, tris(2-ethylhexyl) phosphate, tris(chloroisopropyl) phosphate, tris(chloropropyl) phosphate, isopropylated triphenyl phosphate, mono-, bis- or tris(isopropylphenyl) phosphates of different degrees of isopropylation, resorcinol bis(diphenyl phosphate), bisphenol-A-bis (diphenyl phosphate) or ammonium polyphosphates.

Surface-active substances, especially wetting agents, leveling agents, deaerating agents or defoamers.

Biocides, especially algicides, fungicides or substances that inhibit fungal growth.

Or further substances commonly employed in moisture-curable compositions.

It may be advantageous to dry certain constituents by chemical or physical means before incorporation into the composition.

In a preferred embodiment the composition is free of heavy metal-containing organic compounds. It is in particular free of organic tin compounds.

The composition is preferably produced and stored in the absence of moisture. The composition is typically storage stable in the absence of moisture in a suitable packaging or configuration, such as especially a drum, a bag or a cartridge.

The composition may be in the form of a one-component composition or in the form of a two-component composition.

In the present document "one-component" is to be understood as referring to a composition in which all constituents of the composition are stored mixed together in the same container and which is moisture-curable. In the present document "two-component" is to be understood as meaning a composition in which the constituents of the composition are in two different components which are stored in separate containers. Shortly before or during application of the composition the two components are mixed with one another to cure the mixed composition, wherein the curing is only effected or completed through the action of moisture.

During application of the composition on at least one object or article the silane groups present and any further moisture-reactive groups present come into contact with moisture, thus curing the composition. The curing occurs at different rates according to temperature, type of contact, the amount of moisture and the presence of any catalysts. In the case of curing by means of atmospheric humidity a skin is initially formed at the surface of the composition. The so-called skin forming time is a measure of the curing rate.

A further aspect of the invention is a cured polymer obtainable by curing of a curable polymer described hereinabove.

In the cured state the polymer exhibits highly elastic properties, in particular a high strength and a high extensibility, and also good heat resistance and good adhesion properties on a very wide variety of substrates. This makes it suitable for a multiplicity of uses, in particular as a fiber composite material, potting compound, sealant, adhesive, covering, coating or paint for construction and industrial applications, for example as an electrical insulation compound, filler compound, joint sealant, welding or flanged seam sealant, parquet adhesive, assembly adhesive, autobody adhesive, window adhesive, sandwich element adhesive, floor covering, floor coating, balcony coating, roof coating, concrete protective coating, parking garage coating or as a protective coating against corrosion, as a sealant, paint, lacquer or primer. It is particularly suitable as an adhesive or sealant or coating, in particular for joint sealing or for elastic adhesive joins in construction or industrial applications.

In one embodiment of the cured polymer the cured polymer has at least one of the following properties compared to a comparative polymer, wherein the respective samples have been stored for 14 days at 23° C. and 50% relative humidity before measurement:

Shore A hardness (DIN 53505): ≤90% (preferably ≤85%, more preferably ≤80%) of the comparative polymer;

percentage value of elongation at break (DIN EN 53504, tensile speed: 200 mm/min, S2 test specimen): ≥101% (preferably ≥105%, more preferably ≥110%) of the percentage value for the comparative polymer;

secant modulus (EN ISO 8339, 100% elongation): ≤90% (preferably ≤85%, more preferably ≤80%) of the comparative polymer;

and wherein the comparative polymer was produced in the same way as the cured polymer but with dibutyltin dilaurate in the same molar amount instead of the complex of the lanthanoid with at least one beta-diketonate ligand in the catalyst component in the process as described hereinabove.

The invention further relates to the use of a curable polymer as described hereinabove and/or of the cured polymer as described hereinabove as a sealant, adhesive or coating material.

For use as an adhesive or sealant, the curable polymer preferably has a pasty consistency with pseudoplastic properties. Such a pasty adhesive or sealant is applied to a substrate, optionally using an application robot, in particular from commercially available cartridges operated manually or using compressed air or from a drum or hobbock using a conveying pump or an extruder.

It is possible to bond or seal two identical or two different substrates. Suitable substrates are in particular:

- glass, glass ceramic, screen printed ceramic, concrete, mortar, brick, tile, gypsum or natural stone such as granite or marble;
- metals or alloys, such as aluminum, iron, steel or nonferrous metals, or surface-coated metals or alloys, such as galvanized or chromed metals;
- leather, textiles, paper, wood, with resins, for example phenolic, melamine or epoxy resins, bound wood-based materials, resin-textile composites or further so-called polymer composites;
- plastics, in particular unplasticized or plasticized PVC, ABS, polycarbonate (PC), polyamide (PA), polyester, PMMA, epoxy resins, PUR, POM, PO, PE, PP, EPM or EPDM, wherein the plastics are optionally surface treated using plasma, corona or flame treatments;
- fiber reinforced plastics, such as carbon fiber reinforced plastics (CFRP), glass fiber reinforced plastics (GFRP) or sheet molding compounds (SMC);
- coated substrates, such as powder-coated metals or alloys;
- paints or varnishes, especially automotive topcoats.

If desired the substrates may be pretreated before application of the adhesive or sealant, in particular through physical and/or chemical cleaning processes or application of an adhesion promoter, an adhesion promoter solution or a primer.

After the bonding or sealing of two substrates a glued or sealed article is obtained. Such an article may be a built structures, in particular a high-rise or low-rise built structures, or an industrial good or a consumer good, in particular a window, a household machine or a means of transport such as in particular an automobile, a bus, a heavy goods vehicle, a rail vehicle, a ship, an airplane or helicopter or an attachment thereof.

The moisture-curable composition preferably contains at least one further constituent selected from fillers, crosslinkers, plasticizers, solvents, catalysts, adhesion promoters, drying agents, stabilizers, pigments and rheology additives as described hereinabove. The moisture-curable composition preferably has a content of silane-functional polymers in the range from 5% to 95% by weight, in particular in the range from 10% to 50% by weight.

EXAMPLES

The present invention is more particularly elucidated hereinbelow with reference to the examples without, however, being limited thereto.

Methods and Materials

Determination of shore hardness, elongation at break, tensile strength, tensile stress at 100% elongation and resilience:

After seven days of storage measured from production in a cartridge the moisture-curable compositions were applied to a polyethylene film using a doctor blade to afford membranes having a uniform layer thickness of 2 mm and cured for 14 days at 23° C. and 50% relative humidity, wherein after 7 days the membranes were detached from the film and turned over. The properties of the obtained membranes were subsequently determined by the following methods.

Testing of Shore A hardness was carried out on the membranes according to the specification in DIN ISO 7619-1. To determine Shore A hardness, three membranes were placed on top of one another to ensure a layer thickness of 6 mm.

Elongation at break, tensile strength and tensile stress at 100% elongation were determined by means of a tensile test according to the specification in DIN 53 504 on S2 dumbbells stamped from the membranes produced as described above using a shaped punch. The test speed was 200 mm/min.

Resilience was determined in accordance with ISO 7389 on aluminum test specimens (storage method B).

Viscosity was determined after seven or 60 days of storage and was carried out according to the specification in DIN EN ISO 3219/B3 at a shear rate of 40/s.

The skin forming time of the moisture-curable compositions was determined 7 d after production. Using a doctor blade (200 µm) a film of the adhesive is applied to a glass plate previously cleaned with ethyl acetate and is immediately placed in a drying recorder (BK 3 drying recorder BYK-Gardner). The needle is weighted with 10 g and moved over a distance of 35 cm over a period of 24 hours. The drying recorder was located in a climate controlled room at 23° C. and 50% rel. humidity. The time of disappearance of the permanent trace of the needle from the film was specified as the skin forming time.

The ambient temperature of 23° C. at the time of conducting the experiments is referred to as RT (room temperature).

7 d after production the through-curing of the moisture-curable compositions was determined in a Teflon mold with a wedge-shaped groove which was measured at its lowest point with a layer thickness meter and has a marking at the beginning of the depression. The sealant/adhesive was filled into the groove in excess and avoiding bubbles. The protruding sealant/adhesive was removed using a card or a Japanese spatula. Testing was performed in a climate controlled room under standard climatic conditions (23° C./50% relative atmospheric humidity). From the marking at the beginning of the depression the sealant/adhesive layer was carefully removed after 1 or 3 days until uncured material remained in the mold. This point was marked at the edge and the removed sealant/adhesive was placed in the mold again and lightly pressed into place. The distance between the marking at the beginning of the depression and this marking was measured with a ruler (corresponds to already cured length of the sealant/adhesive). Through-curing D is to be calculated according to the following equation: $D=(l \cdot d)/L$ with l=already cured length of the sealant/adhesive [mm], L=length of the groove [mm] and d=maximum depth of the groove [mm].

The tackiness of the 2 mm membrane after curing for 24 h was assessed by light finger pressure. It was assessed whether the film still had a tacky feel.

In the formulations of the curable composition the auxiliary and additive substances are defined as follows:

| Name | Description | Manufacturer |
|---|---|---|
| Mesamoll ® | plasticizer | Lanxess |
| Fibadur ® Schwarz 400724 | pigment paste | Fink |
| Tronox ® 8300 | pigment | Tronox Inc. |
| Cab-O-Sil ® TS 720 | rheology additive | Cabot Corporation |
| Socal ® U1S2 | filler | Imerys Carbonates |
| Dynasilan ® VTMO | desiccant | Evonik |
| Lupragen ® N700 | catalyst (DBU) | BASF SE |
| Tinuvin ® 292 | stabilizer | BASF SE |
| Tinuvin ® 1130 | stabilizer | BASF SE |
| Irganox ® 1135 | stabilizer | BASF SE |
| Dynasilan ® 1505 | adhesion promoter and/or crosslinker | Evonik |
| Dynasilan ® 1146 | adhesion promoter and/or crosslinker | Evonik |
| Jayflex ® DINP | plasticizer | ExxonMobil Chemical |
| Dynasilan ® 1189 | adhesion promoter | Evonik |

Production of Alkoxysilane-Containing Polyurethanes

Example 1-1 (Inventive)

1174.0 g of a propylene glycol having an OH number of 13 (Acclaim® Polyol 8200 N of Covestro Germany AG; Leverkusen DE) were prepolymerized with 147.2 g of Mesamoll® (Lanxess AG, Leverkusen, DE) and 63.5 g of isophorone diisocyanate at 60° C. with addition of 80 ppm of ytterbium(III) acetylacetonate until the theoretical NCO content of 0.84% was achieved. Then 102.1 g of diethyl N-(3-trimethoxysilylpropyl) aspartate (produced according to EP-A 596 360, Example 5) were rapidly added dropwise and the mixture was stirred until the isocyanate band was no longer visible in the IR spectrum. The obtained polyurethane prepolymer comprising alkoxysilane end groups had a viscosity of 21 100 mPas.

Example 1-2 (Comparative Example)

The procedure described in example 1 was repeated with the exception that instead of 80 ppm of ytterbium(III) acetylacetonate 40 ppm of dibutyltin dilaurate were employed. The obtained polyurethane prepolymer comprising alkoxysilane end groups had a viscosity of 23 500 mPas.

Example 1-3 (Inventive)

1200.0 g of a polypropylene glycol of the OH number 4.9 (produced according to example 7 of EP-A 0654302) were dried in vacuo at 80° C. for six hours. After cooling to 60° C., 24.36 g of 3-isocyanatopropyltrimethoxysilane (Geniosil® GF40, Wacker AG, Burghausen) and 100 ppm of ytterbium(III) acetylacetonate were added and the reaction was prepolymerized until the theoretical NCO content of 0.05% was achieved. 0.4 g of methanol were then added to absorb the excess NCO groups. The mixture was stirred until the isocyanate band was no longer visible in the IR spectrum. The obtained polyurethane prepolymer comprising alkoxysilane end groups had a viscosity of 69 400 mPas (23° C.).

Example 1-4 (Comparative Example)

The procedure described in example 3 was repeated with the exception that instead of 100 ppm of ytterbium(III) acetylacetonate 50 ppm of dibutyltin dilaurate were employed. The obtained polyurethane prepolymer comprising alkoxysilane end groups had a viscosity of 62 200 mPas.

Example 1-5 (Comparative Example)

The procedure described in example 3 was repeated with the exception that instead of 100 ppm of ytterbium(III) acetylacetonate 100 ppm of K-Kat XK-614 (tin-free urethanization catalyst based on zinc, King Industries) were employed. The obtained polyurethane prepolymer comprising alkoxysilane end groups had a viscosity of 70 300 mPas.

Formulation of Moisture-Curable Compositions

The moisture-curable compositions were produced according to the following procedure: All of the components listed in Table 1 with the exception of the adhesion promoters were dispersed in a laboratory dissolver with a butterfly stirrer (200 revolutions/min) and a dissolver disk (2500 revolutions/min) for 15 min under static vacuum and cooling. Static vacuum is to be understood here as meaning that the apparatus is evacuated down to a pressure of 200 mbar (dynamic vacuum) and the connection to the vacuum pump is then severed. Cooling was chosen such that during entirety of production a temperature of 65° C. is not exceeded. The adhesion promoters were then added and the mixture was dispersed under a static vacuum for a further 10 min.

The following data concerning the formulations are in parts by weight.

TABLE 1

| | Example No. | | | | | |
|---|---|---|---|---|---|---|
| | 2-1 | 2-2* | 2-3 | 2-4* | 2-5* | 2-6* |
| Polymer from example 1-1 | 457.56 | | | | | |
| Polymer from example 1-2 | | 457.56 | | | | |
| Polymer from example 1-3 | | | 128.8 | | | |
| Polymer from example 1-4 | | | | 128.8 | 160 | |
| Polymer from example 1-5 | | | | | | 160 |
| Mesamoll ® | 436.5 | 436.5 | | | | |
| Fibadur ® Schwarz 400724 | 1.62 | 1.62 | | | | |
| Tronox ® 8300 | 49.32 | 49.32 | 14.30 | 14.30 | | |
| Cab-O-Sil ® TS 720 | 20.52 | 20.52 | | | | |
| Socal ® U1S2 | 761.76 | 761.76 | 234.1 | 234.1 | 240 | 240 |
| Dynasilan ® VTMO | 26.82 | 26.82 | 6.45 | 6.45 | 9.6 | 9.6 |
| DBU | 1.26 | 1.26 | 0.45 | 0.45 | 0.16 | 0.16 |
| Tinuvin ® 292 | 10.26 | | 2.15 | 2.15 | | |
| Tinuvin ® 1130 | 11.7 | | 2.45 | 2.45 | | |

TABLE 1-continued

| | Example No. | | | | | |
|---|---|---|---|---|---|---|
| | 2-1 | 2-2* | 2-3 | 2-4* | 2-5* | 2-6* |
| Irganox ® 1135 | 6.12 | | 1.30 | 1.30 | | |
| Dynasilan ® 1505 | 8.28 | 8.28 | | | | |
| Dynasilan ® 1146 | 8.28 | 8.28 | | | 4.80 | 4.80 |
| Jayflex ® DINP | | | 106.15 | 106.15 | 96 | 96 |
| Dynasilan ® 1189 | | | 3.85 | 3.85 | | |
| Total | 1800.00 | 1800.00 | 500.00 | 500.00 | 510.56 | 510.56 |

*Comparative example

TABLE 2

| | Example No. | | | | | |
|---|---|---|---|---|---|---|
| | 2-1 | 2-2* | 2-3 | 2-4* | 2-5* | 2-6* |
| Film drying [min] | 45 | 30 | 75 | 65 | 115 | >360 |
| Tackiness 24 h | No | No | No | No | No | Yes |
| Through-curing D [mm] 1 d | 4.3 | 3.6 | 4.2 | 4.2 | ND | ND |
| Through-curing D [mm] 3 d | 5.6 | 5.3 | 6.0 | 6.3 | ND | ND |

ND: not determined

It was found that the compositions according to the invention show comparable values for through-curing compared to those based on alkoxysilane-containing polyurethanes catalyzed with dibutyltin dilaurate. The film drying was in each case in the range of less than 60 min. The composition from comparative example 2-5* (Zn catalysis of the alkoxysilane-containing polyurethane) cures only slowly as is apparent from high film drying times and residual tackiness after 24 h.

Membranes having a thickness of 2 mm were drawn from the formulations and subjected to mechanical examination.

TABLE 3

| | Example No. | | | | | |
|---|---|---|---|---|---|---|
| | 2-1 | 2-2* | 2-3 | 2-4* | 2-5* | 2-6* |
| Shore A after 14 d 23° C./50% rH | 30 | 41 | 13 | 23 | 48 | 45 |
| Shore A after 28 d 23° C./50% rH | 30 | 41 | ND | ND | ND | ND |
| Tensile strength [MPa] | 2.5 | 2.9 | 3.5 | 2.7 | 2.7 | 2.1 |
| Elongation at break [%] | 599 | 579 | 997 | 725 | 411 | 632 |
| Secant modulus at 100% elongation [MPa] | 0.7 | 0.9 | 0.2 | 0.3 | 1.2 | 1.5 |
| Resilience | 90 | 93 | ND | ND | ND | ND |

It was found that the cured compositions according to the invention achieve a significantly reduced secant modulus at 100% elongation compared to the respective comparative examples in which DBTL was used and this is particularly advantageous for use as a low-modulus construction sealant. The tin-free formulation based on zinc compounds (2-6) shows comparably high values for Shore hardness and secant modulus at 100% extension as the tin-containing formulation based on zinc compounds (2-5).

The invention claimed is:

1. A process for producing alkoxysilane-containing polyurethanes comprising the step of reacting
 a compound containing at least one NCO group with
 a compound containing at least one Zerewitinoff-active H atom
 in the presence of a catalyst component,
 wherein the compound containing at least one NCO group and/or the compound containing at least one Zerewitinoff-active H atom contain at least one alkoxysilane group,
 to afford an alkoxysilane-containing polyurethane,
 wherein
 the catalyst component contains a complex of a lanthanoid with at least one beta-diketonate ligand and wherein
 the lanthanoid is ytterbium (III) and the beta-diketonate ligand is obtained by deprotonation of hacac (acetylacetone), hacac-$F_7$ (perfluoroacetylacetone), hbfa (benzoyl-2-furanoylmethane), hbpp (1,3-bis(3-pyridyl)-1,3-propanedione), Hbtfac (benzoyltrifluoroacetone), hbzac (benzoylacetone), hdbbm (di(4-bromo)benzoylmethane), hdcm (d,d-dicampholylmethane), hdmbm (4,4'-dimethoxydibenzoylmethane), hdmh (2,6-dimethyl-3,5-heptanedione), hdnm (dinaphthoylmethane), hdpm (dipivaloylmethane), hdppm (di(perfluoro-2-propoxypropionyl)methane), hdtp (1,3-di(2-thienyl)-1,3-propanedione), hfacam (3-(trifluoroacetyl)-d-camphor), hfdh (6,6,6-trifluoro-2,2-dimethyl-3,5-hexanedione), hfhd (1,1,1,2,2,6,6,7,7,7-decafluoro-3,5-heptanedione), hfod (6,6,7,7,8,8,8-heptafluoro-2,2-dimethyl-3,5-octanedione), hftac (2-furyltrifluoroacetone), hhfac (hexafluoroacetylacetone), hhfbc (3-(heptafluorobutyryl)-d-camphor), hhfth (4,4,5,5,6,6,6-heptafluoro-1-(2-thienyl)-1,3-hexanedione), hmfa (4-methylbenzoyl-2-furanoylmethane), hmhd (6-methyl-2,4-heptanedione), hntac (2-naphthoyltrifluoroacetone), hpop (3-(5-phenyl-1,3,4-oxadiazol-2-yl)-2,4-pentanedione), hppa (3-phenyl-2,4-pentanedione), hpta (=htpm) (pivaloyltrifluoroacetone), hptp (1-phenyl-3-(2-thienyl)-1,3-propanedione), H(t-cam) (3-(tert-butylhydroxymethylene)-d-camphor), htfac (trifluoroacetylacetone), htfn (1,1,1,2,2,3,3,7,7,8,8,9,9,9-tetradecafluoro-4,6-nonanedione), hthd (=hdpm, htmhd) (2,2,6,6-tetramethyl-3,5-heptanedione), htnb (4,4,4-trifluoro-1-(2-naphtyl)-1,3-butanedione), htmod (2,2,6,6-tetramethyl-3,5-octanedione), htrimh (2,2,6-trimethyl-3,5-heptanedione), htod (2,2,7-trimethyl-3,5-octanedione), htta (2-thenoyltrifluoroacetone) or any desired mixture thereof, the catalyst component is free from organic tin compounds and remains in the alkoxysilane-containing polyurethane, and wherein the alkoxysilane-containing polyurethane in cured form has at least one of the following properties compared to a comparative polymer, wherein the respective samples have been stored for 14 days at 23° C. and 50% relative humidity before measurement:

Shore A hardness (DIN 53505): ≤90% of the comparative polymer;

percentage value of elongation at break (DIN EN 53504, tensile speed: 200 mm/min, S2 test specimen): ≥101% of the percentage value of the comparative polymer;

secant modulus (EN ISO 8339, 100% elongation): ≤90% of the comparative polymer;

and wherein the comparative polymer was produced in the same way as the cured alkoxysilane-containing polyurethane but with dibutyltin dilaurate in the same molar amount instead of the complex of the lanthanoid with at least one beta-diketonate ligand in the catalyst component.

2. The process as claimed in claim 1, wherein the complex of a lanthanoid with at least one beta-diketonate ligand is Yb(acac)$_3$.

3. The process as claimed in claim 1, wherein the compound containing at least one NCO group contains at least one alkoxysilane group and in that the compound containing at least one Zerewitinoff-active H atom contains no alkoxysilane group.

4. The process as claimed in claim 1, wherein the compound containing at least one NCO group contains no alkoxysilane group and wherein the compound containing at least one Zerewitinoff-active H atom contains at least alkoxysilane group.

5. The process as claimed in claim 4, wherein the compound containing at least one Zerewitinoff-active H atom contains at least one primary or secondary amino group.

6. An alkoxysilane-containing polyurethane formed from a reaction mixture comprising a catalyst component, wherein the catalyst component contains a complex of a lanthanoid with at least one beta-diketonate ligand and is free from organic tin compounds, wherein the lanthanoid is ytterbium (III) and the beta-diketonate ligand is obtained by deprotonation of hacac (acetylacetone), hacac-F$_7$ (perfluoroacetylacetone), hbfa (benzoyl-2-furanoylmethane), hbpp (1,3-bis(3-pyridyl)-1,3-propanedione), Hbtfac (benzoyltrifluoroacetone), hbzac (benzoylacetone), hdbbm (di(4-bromobenzoylmethane), hdcm (d,d-dicampholylmethane), hdmbm (4,4'-dimethoxydibenzoylmethane), hdmh (2,6-dimethyl-3,5-heptanedione), hdnm (dinaphthoylmethane), hdpm (dipivaloylmethane), hdppm (di(perfluoro-2-propoxypropionyl)methane), hdtp (1,3-di(2-thienyl)-1,3 -propanedione), hfacam (3-(trifluoroacetyl)-d-camphor), hfdh (6,6,6-trifluoro-2,2-dimethyl-3,5-hexanedione), hfhd (1,1,1,2,2,6,6,7,7,7-decafluoro-3,5-heptanedione), hfod (6,6,7,7,8,8,8-heptafluoro-2,2-dimethyl-3,5-octanedione), hftac (2-furyltrifluoroacetone), hhfac (hexafluoroacetylacetone), hhfbc (3-(heptafluorobutyryl)-d-camphor), hhfth (4,4,5,5,6,6,6-heptafluoro-1-(2-thienyl)-1,3-hexanedione), hmfa (4-methylbenzoyl-2-furanoylmethane), hmhd (6-methyl-2,4-heptanedione), hntac (2-naphthoyltrifluoroacetone), hpop (3-(5-phenyl-1,3,4-oxadiazol-2-yl)-2,4-pentanedione), hppa (3-phenyl-2,4-pentanedione), hpta (=htpm) (pivaloyltrifluoroacetone), hptp (1-phenyl-3-(2-thienyl)-1,3-propanedione), H(t-cam) (3-(tert-butylhydroxymethylene)-d-camphor), htfac (trifluoroacetylacetone), htfn (1,1,1,2,2,3,3,7,7,8,8,9,9,9-tetradecafluoro-4,6-nonanedione), hthd (=hdpm, htmhd) (2,2,6,6-tetramethyl-3,5-heptanedione), htnb (4,4,4-trifluoro-1-(2-naphtyl)-1,3-butanedione), htmod (2,2,6,6-tetramethyl-3,5-octanedione), htrimh (2,2,6-trimethyl-3,5-heptanedione), htod (2,2,7-trimethyl-3,5-octanedione), htta (2-thenoyltrifluoroacetone) or any desired mixture thereof, wherein the alkoxysilane-containing polyurethane in cured form has at least one of the following properties compared to a comparative polymer, wherein the respective samples have been stored for 14 days at 23° C. and 50% relative humidity before measurement:

Shore A hardness (DIN 53505): ≤90% of the comparative polymer;

percentage value of elongation at break (DIN EN 53504, tensile speed: 200 mm/min, S2 test specimen): ≥101% of the percentage value of the comparative polymer;

secant modulus (EN ISO 8339, 100% elongation): ≤90% of the comparative polymer;

and wherein the comparative polymer was produced in the same way as the cured alkoxysilane-containing polyurethane but with dibutyltin dilaurate in the same molar amount instead of the complex of the lanthanoid with at least one beta-diketonate ligand in the catalyst component.

7. The polyurethane as claimed in claim 6, wherein the polyurethane is obtained by a process comprising the step of reacting a compound containing at least one NCO group with a compound containing at least one Zerewitinoff-active H atom in the presence of a catalyst component, wherein the compound containing at least one NCO group and/or the compound containing at least one Zerewitinoff-active H atom contain at least one alkoxysilane group, to afford the alkoxysilane-containing polyurethane, wherein the catalyst component contains a complex of a lanthanoid with at least one beta-diketonate ligand and wherein the catalyst component is free from organic tin compounds.

8. A process for producing a curable polymer, wherein the process comprises the step of contacting a polyurethane as claimed in claim 6 with a siloxane condensation catalyst.

9. The process as claimed in claim 8, wherein the polymer is further contacted with water.

10. A curable polymer, wherein the curable polymer is obtained by the process as claimed in claim 8.

11. A cured polymer, wherein the cured polymer is obtained by curing the curable polymer as claimed in claim 10.

12. A sealant, adhesive or coating material comprising the curable polymer as claimed in claim 10.

* * * * *